Nov. 17, 1959 H. T. FREESTONE 2,913,624

VERTICAL OUTPUT STAGE

Filed Sept. 16, 1957

INVENTOR:
HARRY T. FREESTONE,
BY Donald N. Timbie
HIS ATTORNEY.

2,913,624
Patented Nov. 17, 1959

2,913,624

VERTICAL OUTPUT STAGE

Harry T. Freestone, North Syracuse, N.Y., assignor to General Electric Company, a corporation of New York Application September 16, 1957, Serial No. 684,055

9 Claims. (Cl. 315—27)

The present invention relates to a deflection circuit and more particularly to a circuit for providing current for the vertical winding of the deflection yoke in a television system.

It is common practice to utilize a multivibrator circuit for producing the saw-tooth currents required for vertical deflection of the electron beam in a television picture tube. One of the elements in the vertical multivibrator circuit is a size control that permits adjustment of the magnitude of deflection current produced by the multivibrator. In many conventional multivibrator circuits the size control determines the bias on the multivibrator output tube and consequently the current through this tube. The disadvantage of this type of control is that it also affects the linearity of the picture. If it is desired to change only the size of the picture it is a nuisance if linearity is changed by the size adjustment. Because then the linearity control must be adjusted which in turn has some affect upon the size; then the size control must be readjusted, etc.

Accordingly, an object of the present invention is to provide a vertical deflection multivibrator stage in which the size control does not affect linearity.

If a tube having more grids than a triode, for example a pentode or a tetrode, is used as the multivibrator output tube, the size control can be utilized to control the screen voltage of this tube. Of course the screen voltage has an appreciable affect, although not as great as that of the control grid voltage, upon the current through the tube. Although size adjustment by means of the screen grid voltage produces less change in linearity than does size adjustment by control grid voltage, the change in linearity is still sufficient to be objectionable in the usual circuit.

Another object of the present invention is to provide a vertical output multivibrator stage that utilizes a screen circuit size control element that does not affect linearity.

In accordance with one form of my invention I provide a multivibrator type vertical output stage in which the output tube is a tetrode or a pentode. A variable resistor controls the screen voltage of the output stage and thus the current in this stage to provide size adjustment. The RC network for the multivibrator is energized by the screen voltage. Thus, an increase in screen voltage increases the drive of the RC network and likewise a decrease in screen voltage decreases this drive. It will be shown that the change of drive with change of screen voltage produced by an adjustment of the size control resistor can compensate almost entirely for the change in linearity that would otherwise result therefrom.

My invention will be better understood from the following description taken in connection with the accompanying drawing in which.

Figures 1, 2:
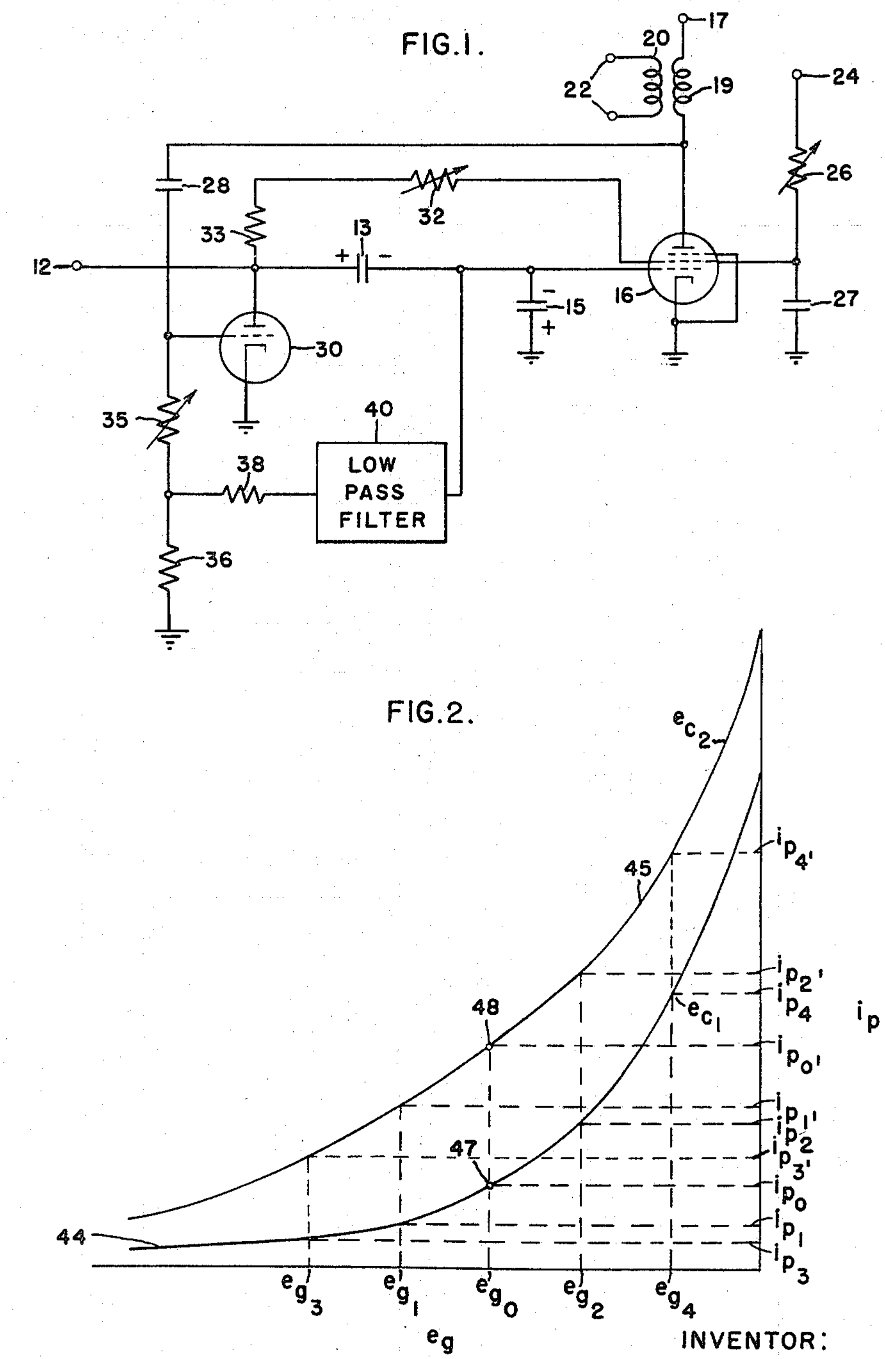
Fig. 1 is a circuit diagram of a preferred embodiment of my invention.
Fig. 2 is a graph of the transfer characteristics of the output stage of the circuit of Fig. 1.

The circuit of Fig. 1 is a modified multivibrator having an input terminal 12 to which the negative vertical synchronizing pulses from the video signal can be applied. These synchronizing pulses, when applied, are coupled through a D.C. blocking capacitor 13, across a shunt connected capacitor 15, to the input of an electron discharge device 16. Capacitor 15 is the charging capacitor for the RC network of the multivibrator.

Although discharge device 16 is shown to be a pentode it could as well be a form of tetrode such as a beam power tetrode or another type of electron discharge device having two current control elements, such as grids. The plate current for tube 16 is obtained from a source (not shown) joined to a terminal 17. In the plate circuit there is a vertical output transformer comprising a primary winding 19 and a secondary 20 that is connected through two terminals 22 to the vertical deflection windings (not shown) of a television system. The screen voltage for tube 16 is provided by a source (not shown) connected to a terminal 24. A means is inserted for controlling the magnitude of voltage on terminal 24 that is applied to the screen grid of tube 16. This means is a variable impedance 26 that is here shown to be a variable resistor. A capacitor 27 is preferably joined between the screen grid and a source of constant potential, here shown to be ground, for smoothing any voltage variations that might otherwise be present in the screen grid voltage.

When a negative synchronizing pulse is applied at the grid of tube 16, it is inverted by the action of the tube to a positive pulse at the plate. This positive pulse is conducted through a charging capacitor 28 to the input of an electron discharge device 30 that is shown to be a triode but it could be another type discharge device.

The voltage for the plate of tube 30 is obtained from the screen of tube 16 through a linearity control variable resistor 32 and a plate resistor 33 connected in series. The combined magnitudes of resistors 32 and 33 are such that they are much greater than the internal resistance of tube 30 when it is in a conducting state. Also, these resistors are part of the RC network for the multivibrator. The grid circuit of tube 30 includes a hold control variable resistor 35 that is connected in series with a bias resistor 36. As will be subsequently explained, a bias voltage is developed across resistor 36 due to the discharge of capacitor 28. This voltage is transmitted through a resistor 38 and a low-pass filter 40 to the grid of tube 16. This bias voltage is preferably of a magnitude such that tube 16 produces a maximum output for any given input on its control grid. The need for resistor 38 is perhaps not very evident. It is required because the resistance of resistor 36, which is determined by bias purposes, is so low that it cannot provide sufficient resistance for the discharge path of capacitor 15, which also includes resistor 38 and low-pass filter 40. Resistor 38 must be included in this path to provide the required resistors. Low-pass filter 40 is not absolutely necessary but it is preferably inserted to filter out the fluctuations in the voltage across resistor 36 produced by the periodic discharge of capacitor 28.

Tube 30 is normally maintained in a non-conducting state by the bias produced by the discharge of capacitor 28 through resistors 35 and 36. However, each positive pulse on the plate of tube 16 resulting from the inversion of the negative sync pulses raises the grid of tube 30 sufficiently to cause conduction in this tube. This conduction places the plate of tube 30 practically at ground potential due to the relatively low internal resistance of this tube when conducting. Thus, when tube 30 conducts the positive plate of capacitor 13 is grounded and capacitors 13 and 15 are in substantially parallel relationship. Immediately before conduction of tube 30 capacitor 13 is charged up to a large voltage through resistors 32 and 33. When tube 30 conducts, the positive plate of capacitor 30 is placed at substantially ground potential and thus this large voltage is applied suddenly in a negative fashion to the capacitor 15 and to the control grid of tube 16. The result is that tube 16 is suddenly cut off. This cut-off, of course, terminates the current flow through primary winding 19. The resulting collapse of the field about winding 19 produced a very large positive pulse on the plate of tube 16. This positive pulse is coupled through capacitor 28 and renders the control grid of tube 30 positive. The resulting grid current in tube 30 charges capacitor 28 to the amplitude of the positive pulse and causes the voltage across this capacitor to increase to the magnitude of this positive pulse. After this pulse reaches its maximum amplitude and starts decreasing the voltage upon capacitor 28 does not decrease with it because as soon as the pulse starts decreasing, the grid of tube 30 goes negative thereby opening the circuit between the grid and cathode. Then the only discharge path for capacitor 28 is through hold-control variable resistor 35 and biasing resistor 36. The discharge current through these resistors produces a negative cut-off bias on tube 30 thereby eliminating the parallel relationship between capacitors 13 and 15. Thereafter, capacitor 15, which has been charged negative on its upper plate, begins losing its negative charge mainly through the discharge path of low-pass filter 40 and resistors 38 and 36. I say "mainly" because there is another discharge path through capacitor 13, resistors 33, 32, and 36 and through the source connected to terminal 24. Very little current flows through this latter path because its total resistance is so much higher than that of the path including, low-pass filter 40 and resistors 36 and 38. As the upper plate of capacitor 15 becomes more positive, tube 16 conducts and there is an increasing flow of plate current. This increasing plate current is transformed by primary 19 and secondary 20 into a saw-tooth wave form for energizing the vertical deflection coils (not shown) of a television system that is connected to terminals 22. The plate current of tube 16 continues to increase until a negative synchronizing pulse is applied at terminal 12. Then the cycle is repeated.

The hold variable resistor 35 determines the natural frequency of oscillation of the multivibrator. This resistor controls the rate of discharge of the electrons from capacitor 28, and thus the time that tube 30 is cut off. For example, if resistor 35 is set at a very low value, capacitor 28 discharges almost completely between the application of synchronizing pulses at terminal 12. Then tube 30 conducts before the application of a synchronizing pulse and initiates the multivibrator cycle at a faster rate than the rate of the synchronizing pulses. On the other hand, if a very large amount of resistance is set in by controlled resistor 35, capacitor 28 discharges very little between synchronizing pulses and the positive pulse from tube 16, that is initiated by each synchronizing pulse, may not be of sufficient magnitude to overcome the negative bias from capacitor 28 in order to cause conduction in tube 30. The optimum setting for resistor 35 is at a resistance that provides a natural frequency of oscillation slightly lower than the repetition rate of the negative synchronizing pulses applied at terminal 12. With this setting the synchronizing pulses initiate cycling.

The linearity control resistor 32 determines the voltage change across capacitor 15 during the time between the application of synchronizing pulses at terminal 12. This is not too evident. It is perhaps best explained in a step-wise manner. First of all it should be evident that the value of resistor 32 determines the magnitude of voltage on capacitor 13 because this resistor is in the charge path for this capacitor. Secondary, the maximum negative voltage across capacitor 15 is dependent upon the voltage across capacitor 13 because it is this voltage on capacitor 13 that charges up capacitor 15 when tube 30 conducts. Thus, the setting of resistor 32 determines the maximum negative voltage upon capacitor 15. Before proceeding further, it should be realized that the voltage change across any capacitor during a fixed time is dependent upon the initial voltage on that capacitor and the resistance of the discharge path, as well as the capacitance of the capacitor. If the resistance of the discharge path is constant and the capacity of the capacitor is constant then the rate of change of voltage across the capacitor will be dependent only upon the initial magnitude of the voltage on the capacitor before it started discharging. Now the capacitance of capacitor 15 is of course fixed. The resistance of the main discharge path through resistors 36, 38, and low-pass filter is fixed. The resistance of the other discharge path can be varied somewhat by resistor 32. However, as a practical matter, it has been previously explained that this latter discharge path has such an inappreciable effect that it can be neglected. Therefore, for practical purposes the capacity of capacitor 15 and the resistance of the discharge path for this capacitor are constant. Therefore, the voltage change across this capacitor due to its discharge during the time between synchronizing pulses is a function of the initial voltage on this capacitor before it started discharging. As has previously been explained, this initial voltage is dependent upon the setting of resistor 32. Therefore, it is evident that the setting of resistor 32 determines the voltage change across capacitor 15 during the time between synch pulses. This change in voltage across capacitor 15, which is the input to tube 16, is often referred to as the drive for tube 16. It will be shown subsequently that a change in drive for this tube changes the linearity in the output from this tube.

Referring now to Fig. 2, to aid in the explanation of the linearity control 32 as well as the size control 26, there is shown transfer characteristics for tube 16. A transfer characteristic is a graph of the change in plate current ($i_p$) produced by a change in grid voltage ($e_g$). Usually several curves are shown, each corresponding to a different bias voltage on the control grid. However, in Fig. 2 the two curves 44 and 45 are for different screen voltages on tubes 16 rather than for different grid bias voltages because the bias voltage is fixed. Curve 44 is the transfer characteristic for a screen voltage of $e_{c_1}$ and curve 45 is the transfer characteristic for screen voltage $e_{c_2}$. The screen voltage $e_{c_2}$ is greater than $e_{c_1}$. Both are positive voltages. Assume that the bias voltage across resistor 36 is $e_{g_0}$ and that the plate voltage for this bias is $i_{p_0}$. The corresponding point on curve 44 is point 47. Also assume that the setting of resistor 32 is such that the drive from capacitor 15 varies from a value $e_{g_1}$ to $e_{g_2}$. From curve 44 it is seen that the resulting change in plate current is from $i_{p_1}$ to $i_{p_2}$. Due to the curvature in curve 44 the change in plate current is not linear with the change in grid voltage. Now assume that the setting of resistor 32 is such that the drive is from $e_{g_3}$ to $e_{g_4}$. The resulting plate current change is from $i_{p_3}$ to $i_{p_4}$. This change of plate current is even more non-linear than was the prior change. Thus, it is seen that the degree of non-linearity in the plate current of tube 16 is controlled by the setting of resistor 32. Because the vertical deflection current is merely the transformed plate current of tube 16, the setting of resistor 32 also affects the linearity of this vertical deflection current.

The operation of the size control resistor 26 can also be illustrated by Fig. 2. If the resistance of size control variable resistor 26 is lowered there is less voltage drop across this resistor and more voltage from terminal 24 is applied to the screen grid of tube 16. Assume that the change in setting of resistor 26 changes the screen grid voltage from $e_{c_1}$ to $e_{c_2}$, so that the new operating point is point 48 on curve 45. At this point the plate current is $i_{p_0'}$. If the change in screen voltage did not change the drive, a change in grid voltage from $e_{g_1}$ to $e_{g_2}$ would produce a change in plate current from $i_{p_1'}$ to $i_{p_2'}$.

This change is greater than that from $i_{p1}$ to $i_{p2}$ that was obtained with curve 44. Thus, the operation of variable resistor 26 does change the magnitude of plate current variation and consequently the magnitude of vertical deflection current. Of course the size of the picture appearing on the television screen depends upon the magnitude of the vertical deflection current.

If with this size control adjustment there is no change in drive, there is a change in linearity because curve 45 between points corresponding to $e_{g1}$ and $e_{g2}$ is more linear than is curve 44 between such corresponding points. At first thought it might seem that a linear plate current is desired because it is well known that the vertical deflection current should be linear. However, non-linearities are produced in the transformation of the plate current by the transformer primary winding 19 and secondary winding 20. Thus, the plate current must be non-linear in order to compensate for the transformation non-linearities. Therefore, it may be that the rendering of the plate current more linear causes a non-linearity in the deflection current. Accordingly, there should be the same non-linearity obtained from curve $e_{c2}$ that there was obtained from $e_{c1}$ if there is to be no change in linearity with the adjustment of size control resistor 26. This non-linearity can be obtained if the drive is changed with a change of screen grid voltage. In the circuit of Fig. 1, the drive is increased when size control 26 is decreased in resistance for there is more voltage applied not only to the screen grid of tube 16 but also to resistor 32. This increase of voltage has the same effect as a decrease in the resistance of resistor 32 which, as previously mentioned, increases the drive. Assume that a decrease in resistance of resistor 26 produces an increase of drive to between $e_{g3}$ and $e_{g4}$. Because curve 45 is more non-linear between points corresponding to $e_{g3}$ and $e_{g4}$ than between points corresponding to $e_{g1}$ and $e_{g2}$, the change in plate current from $i_{p3}$, to $i_{p4}$, is more non-linear. In fact, through selection of an output tube 16 with desired characteristics, this increase in drive can be made to produce almost exactly the same non-linearity as was obtained with curve 44 and a drive between $e_{g1}$ and $e_{g2}$.

From the foregoing discussion it is seen that a multivibrator type vertical deflection stage has been disclosed in which size control operation can be had independent of linearity control. This result is obtained by the placing of the size control in the screen grid circuit of an electron tube or in a corresponding circuit of another type electron discharge device. The linearity control is placed in the grid circuit of this tube. The voltage for the linearity system is obtained from the screen grid so that a change in size also produces a change in drive. This change in drive compensates for the change in operating characteristics produced by the change of screen voltage. Through the use of tubes with preselected operating characteristics, these two changes can be made to completely compensate for one another so that there is no change in linearity when the size control is operated. For purposes of simplification, the invention has been shown to be applicable to only one type of multivibrator circuit. However, it is applicable to many types of multivibrators.

While I have illustrated a particular embodiment of my invention, it will of course be understood that I do not wish to be limited thereto, since various modifications may be made and I contemplate by the appended claims to cover any such modifications as come within the true spirit annd scope of my invention.

What I claim as new and desire to secure by Letters Patent of the United States is:

1. A vertical output stage for producing current for the deflection yoke in a television system, said stage comprising: a first terminal for connection to a source of vertical sync pulses; a first electron discharge device having a control grid, a screen grid, a cathode, and a plate; a first capacitor joined between said first terminal and the control grid of said first electron discharge device; a second capacitor joined between the control grid and cathode of said first electron discharge device; a second terminal for connection to a source of constant potential; a first variable resistor joined between said second terminal and the screen grid of said first electron discharge device; a third capacitor joined between the screen grid and the cathode of said first electron discharge device; a third terminal for connection to a source of constant potential; a transformer including a primary winding connected between said third terminal and the plate of said first electron discharge device; a second electron discharge device having a plate, a grid, and a cathode; a fourth capacitor joined between the plate of said first electron discharge device and the control grid of said second electron discharge device; a second variable resistor and a first resistor joined in series between the control grid and cathode of said second electron discharge device; a connection between the cathode of said first electron discharge device and the cathode of said second electron discharge device; a third variable resistor and a second resistor joined in series between said screen grid of said first electron discharge device and the plate of said second electron discharge device; a connection between the plate of said second electron discharge device and said first terminal; and a third resistor and a low pass filter joined in series between the control grid of said first electron discharge device and the point of connection between said second variable resistor and said first resistor.

2. An output stage for providing current for deflecting electrons in a cathode ray tube comprising, a multivibrator including an electron discharge device having at least a cathode, a first control element, a second control element, and a plate, an output circuit connected to the plate of said electron discharge device for providing a deflection current from said multivibrator circuit, a resistance-capacitance network in said multivibrator connected between said first and second control elements for providing a drive voltage for said first element, means for applying a controllable amount of voltage on said second control element, said electron discharge device having a transfer characteristic such that any effect upon linearity of the output of said electron discharge device resulting in a change in voltage applied by said last named means to said second control electrode is compensated for by a resulting change in drive to said first control element.

3. A vertical output stage for producing current for the deflection yoke of a television system comprising a multivibrator including an electron discharge device having a control grid, a screen grid, a cathode and a plate, an output circuit connected to said plate, a resistance-capacitance network connected to said control grid for applying a periodically varying voltage on said control grid, means for providing a controllable magnitude of voltage on said screen grid, means connecting said resistance-capacitance network to said screen grid whereby changes in voltage on said screen grid results in changes in voltage on said control grid.

4. An output stage for producing a deflection current for the deflection yoke of a television system comprising a multivibrator having a first electron discharge device having input and output electrodes, a second electron discharge device having input and output electrodes and an auxiliary control electrode, means for providing a controllable magnitude of voltage on said auxiliary control electrode, a load connected to the output electrode of said second electron discharge device, means for coupling the output of said second electron discharge device to the input electrode of said first electron discharge device, a variable resistance connected between the auxiliary control electrode of said second electron discharge device and the output electrode of said first electron discharge device, a capacitance connected between the output electrode of said first electron discharge device and the input electrode of said second electron discharge device, and means including said capacitance for applying an input signal to the control electrode of said second discharge device.

5. An output stage for producing a deflection current for the deflection yoke of a television system comprising a multivibrator including a multi-element electron discharge device having at least a cathode, a first control element, a second control element and an anode, a load circuit connected to said anode, said multivibrator also including a resistance-capacitance network connected to said first control element for producing a varying drive voltage thereon, means for providing a controllable amount of voltage on said second control element, means coupled between said anode and said resistance-capacitance network for controlling the conduction of said multi-element electron discharge device, means for coupling said second control element to said resistance-capacitance network whereby changes in voltage on said second control element effect changes in drive on said first control element.

6. The structure set forth in claim 5 wherein said means for providing a controllable amount of voltage consists of a variable resistance connected between said second control element and a source of constant voltage.

7. An output stage for providing current for the vertical deflection coils of a television system comprising a multivibrator having an electron discharge device with at least first and second control elements and an anode for providing an output current at said anode which is a function of the voltages applied to said first and second control elements, circuit means connected between said anode and said first control element for producing a varying voltage on said first control element, means for applying an input signal to said circuit means, means for applying a controllable amount of voltage to said second control element to said circuit means whereby a change in voltage on said second control element produces a change in voltage on said first control element.

8. A multivibrator circuit for providing deflection current in which a size control changes the magnitude of the deflection current without appreciably altering its linearity comprising a first discharge device having a cathode, control grid, screen grid and plate, a source of positive operating potential, an inductive load circuit for providing the deflection current to an output connected between said source and said plate, means for connecting said cathode to ground, a second discharge device having a cathode, a control grid and a plate, means for connecting said latter cathode to ground, a capacitor connected between said plate of said first electron discharge device and said control grid of said second discharge device, resistance connected between said latter grid and ground, a size control for applying a variable positive direct current operating potential to said screen grid of said first discharge device, a linearity control having variable resistance connected between said screen grid and said plate of said second discharge device, a capacitor connected between said plate of said second discharge device and said control grid of said first discharge device, another capacitor connected between said control grid of said first discharge device and ground, and means providing a resistive path between said control grid of said first discharge device and ground.

9. A circuit as set forth in claim 8 wherein said last mentioned means is comprised of a direct current path between said control grid of said first discharge device and a point on the resistance that is connected between said control grid of said second discharge device and ground.

References Cited in the file of this patent

UNITED STATES PATENTS

| | | |
|---|---|---|
| 2,025,208 | Hoover | Dec. 24, 1935 |
| 2,153,217 | Van Der Mark | Apr. 4, 1939 |
| 2,489,312 | Pacini | Nov. 29, 1949 |
| 2,508,879 | Zagor | May. 23, 1950 |
| 2,574,253 | Duffy | Nov. 6, 1951 |

FOREIGN PATENTS

| | | |
|---|---|---|
| 694,531 | Great Britain | July 22, 1953 |